US007692652B2

(12) United States Patent
Parenteau et al.

(10) Patent No.: US 7,692,652 B2
(45) Date of Patent: *Apr. 6, 2010

(54) SELECTIVELY TRANSFORMING OVERLAPPING ILLUSTRATION ARTWORK

(75) Inventors: Alexandre S. Parenteau, San Jose, CA (US); Lubomir D. Bourdev, San Jose, CA (US)

(73) Assignee: Adobe Systems Incorporated, San Jose, CA (US)

(*) Notice: Subject to any disclaimer, the term of this patent is extended or adjusted under 35 U.S.C. 154(b) by 2 days.

This patent is subject to a terminal disclaimer.

(21) Appl. No.: 11/845,721

(22) Filed: Aug. 27, 2007

(65) Prior Publication Data

US 2008/0074439 A1 Mar. 27, 2008

Related U.S. Application Data

(63) Continuation of application No. 10/703,679, filed on Nov. 7, 2003, now Pat. No. 7,262,782.

(51) Int. Cl.
*G06T 15/60* (2006.01)
(52) U.S. Cl. ..................................... 345/426
(58) Field of Classification Search .................. 345/426
See application file for complete search history.

(56) References Cited

U.S. PATENT DOCUMENTS

| 5,463,728 | A | * | 10/1995 | Blahut et al. ............... 715/807 |
| 5,555,352 | A | | 9/1996 | Lucas |
| 5,625,766 | A | * | 4/1997 | Kauffman ................... 382/294 |
| 5,889,527 | A | | 3/1999 | Tsai |
| 5,912,672 | A | | 6/1999 | Ligouri |
| 5,936,634 | A | | 8/1999 | Kawamoto et al. |
| 5,991,461 | A | | 11/1999 | Schmucker et al. |
| 6,020,897 | A | | 2/2000 | Carlsen et al. |
| 6,049,339 | A | | 4/2000 | Schiller et al. |
| 6,198,489 | B1 | | 3/2001 | Salesin et al. |
| 6,262,746 | B1 | * | 7/2001 | Collins ....................... 345/629 |
| 6,353,450 | B1 | * | 3/2002 | DeLeeuw ................... 715/768 |
| 6,515,675 | B1 | | 2/2003 | Bourdev |
| 6,570,579 | B1 | | 5/2003 | MacInnis et al. |
| 6,720,977 | B1 | | 4/2004 | Bourdev et al. |
| 6,744,918 | B1 | | 6/2004 | Caldato et al. |
| 6,894,704 | B1 | | 5/2005 | Bourdev et al. |
| 6,919,892 | B1 | * | 7/2005 | Cheiky et al. ............... 345/473 |
| 6,999,101 | B1 | * | 2/2006 | Sanborn et al. ............. 345/619 |

(Continued)

OTHER PUBLICATIONS

Heckbert (ed.), Graphics Gems IV, 1994, AP Professional, Academic Press, Inc., Cambridge, MA, pp. 29-30.

*Primary Examiner*—Javid A Amini
(74) *Attorney, Agent, or Firm*—Fish & Richardson P.C.

(57) ABSTRACT

Computer-implemented methods and apparatus for converting a computer graphics illustration that includes a plurality of overlapping artwork elements from an input format to an output format that differs from the input format. The overlapping artwork elements are classified as transparent or non-transparent artwork elements. The transparent artwork elements are classified as being compatible or incompatible with the output format. The incompatible transparent artwork elements and any of the artwork elements that are at least partially overlapped by any of the incompatible transparent artwork elements are transformed into transformed artwork elements, without transforming any compatible artwork element that is not overlapped by an incompatible transparent artwork element. The transformed artwork elements are compatible with the output format.

42 Claims, 4 Drawing Sheets

U.S. PATENT DOCUMENTS

| | | | |
|---|---|---|---|
| 7,027,054 B1 * | 4/2006 | Cheiky et al. | 345/473 |
| 7,095,527 B2 * | 8/2006 | Ahrens | 358/1.18 |
| 7,236,642 B2 * | 6/2007 | Ahrens et al. | 382/261 |
| 7,242,415 B1 * | 7/2007 | Yhann et al. | 345/629 |
| 2003/0018817 A1 * | 1/2003 | Ahrens et al. | 709/246 |
| 2003/0138043 A1 * | 7/2003 | Hannuksela | 375/240.08 |
| 2004/0028294 A1 * | 2/2004 | Fukuda | 382/305 |

* cited by examiner

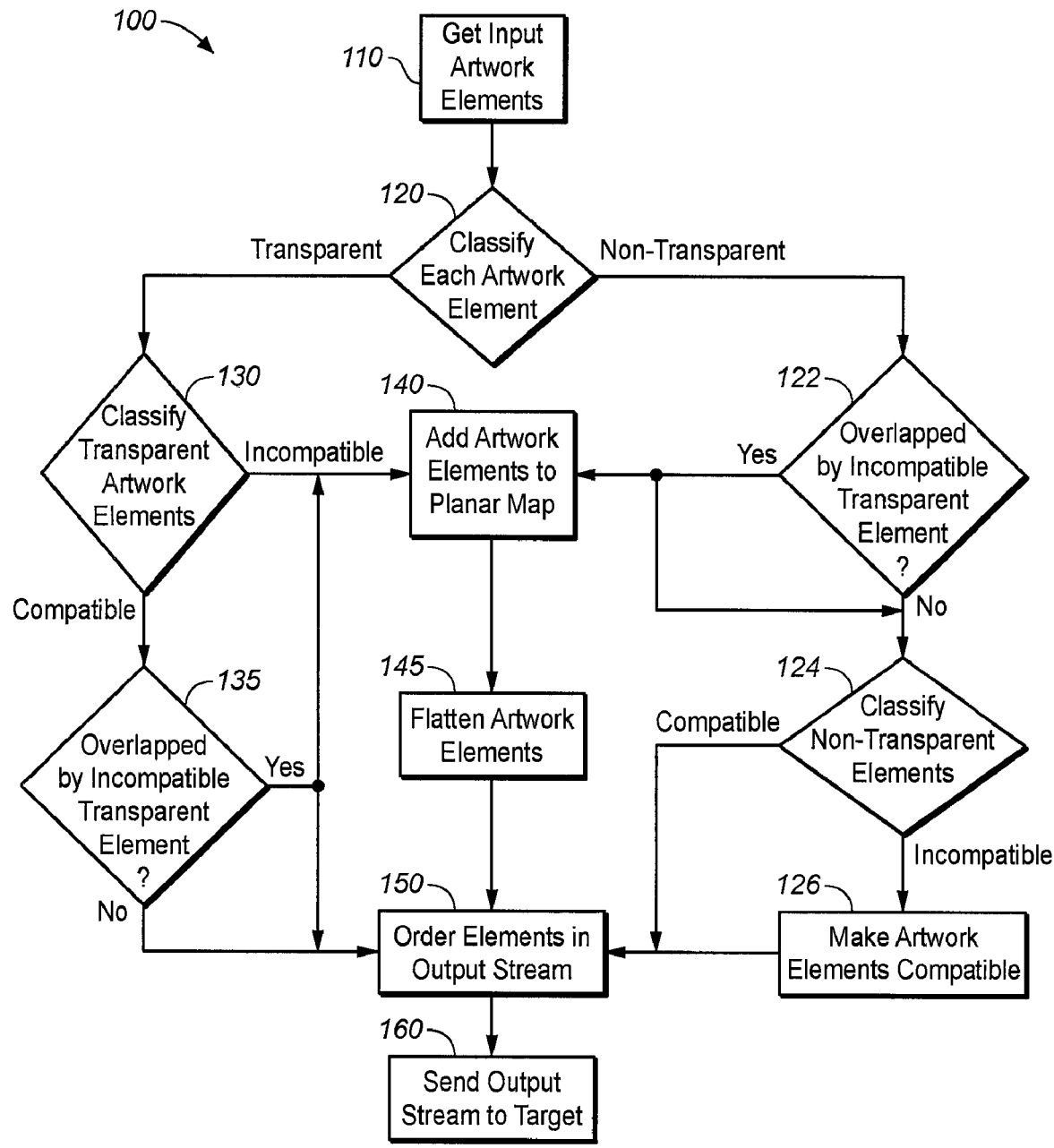
FIG._1

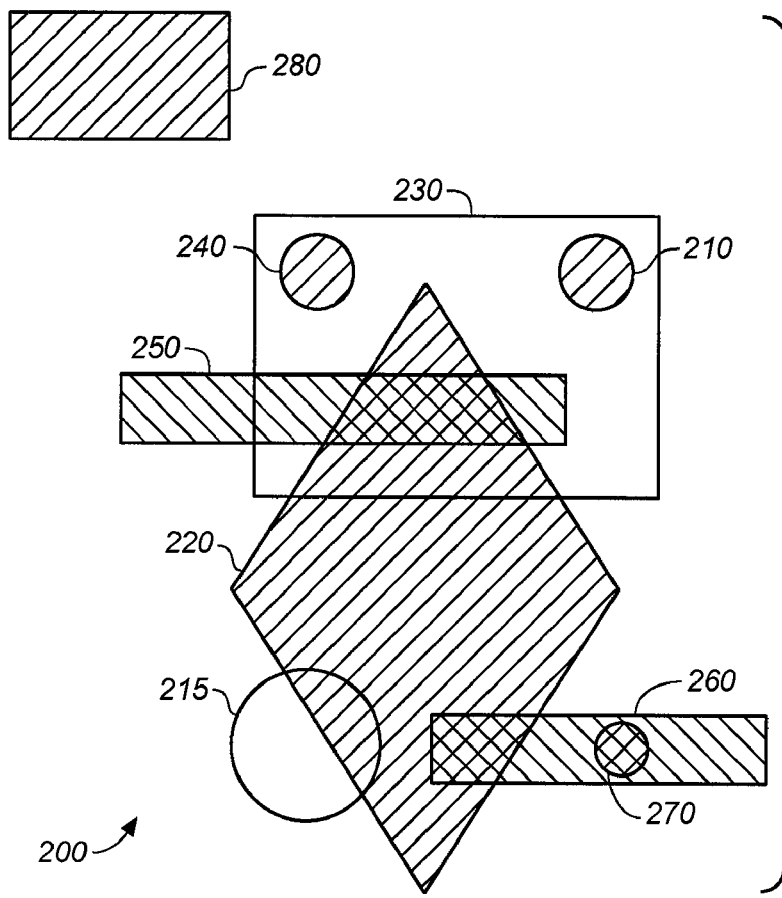
*FIG._2A*
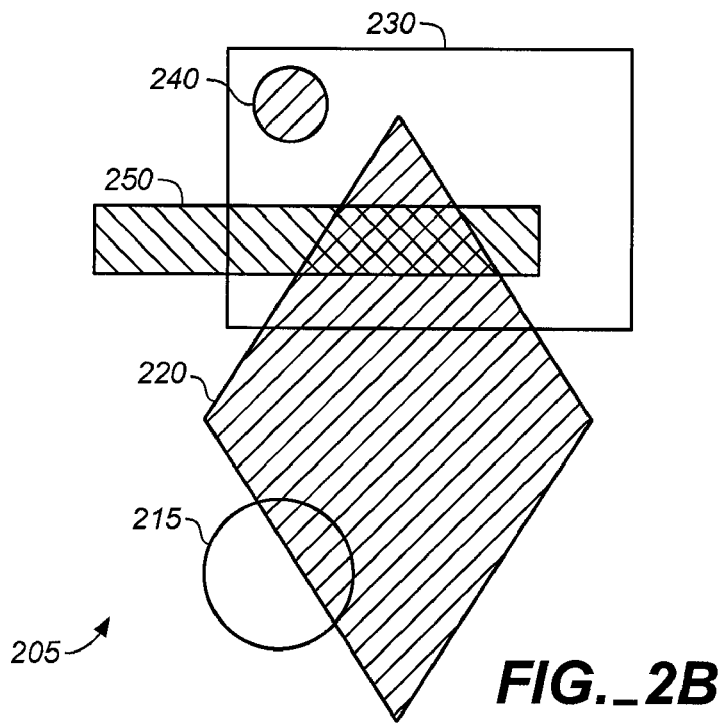
*FIG._2B*

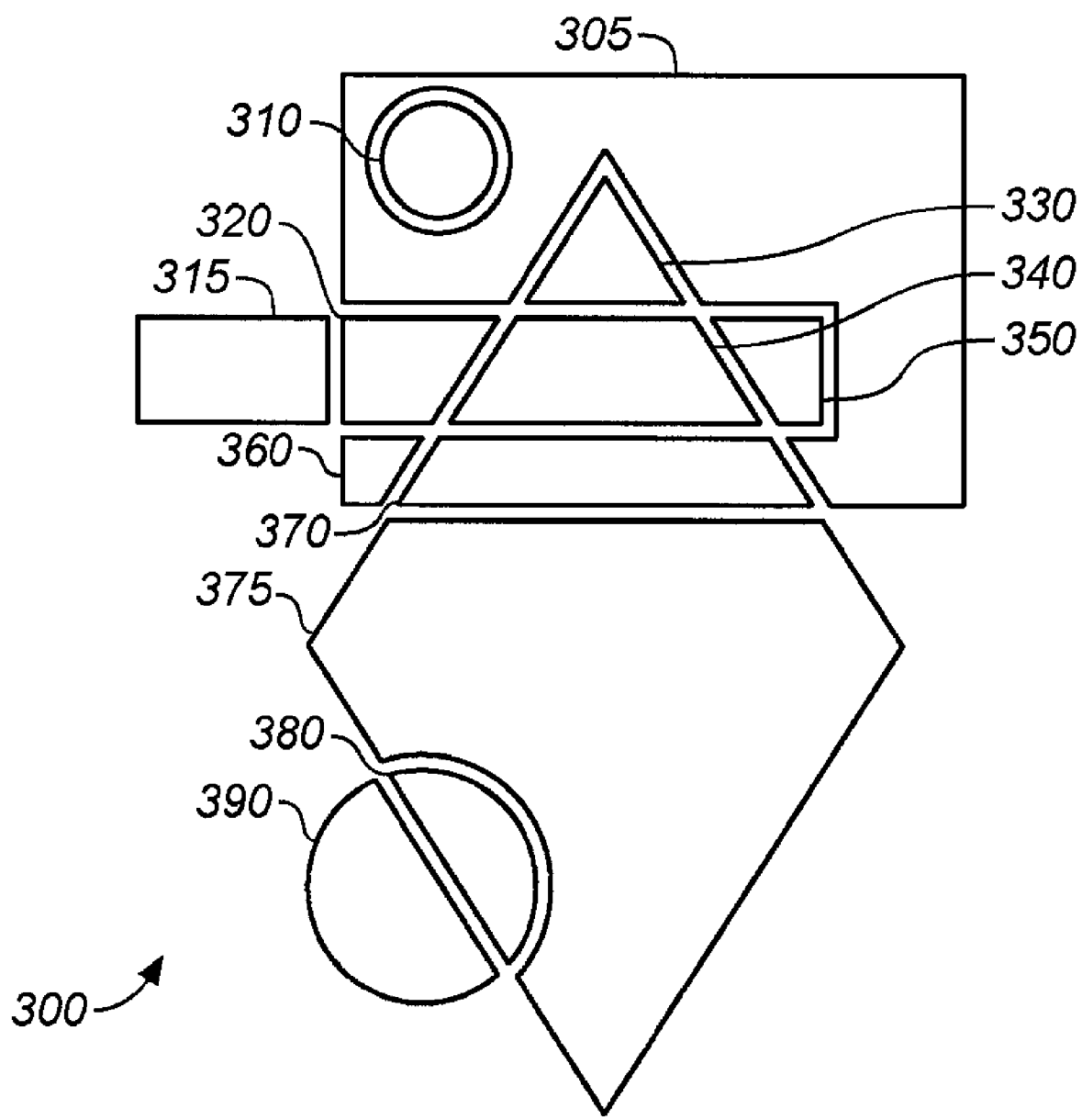
FIG._3

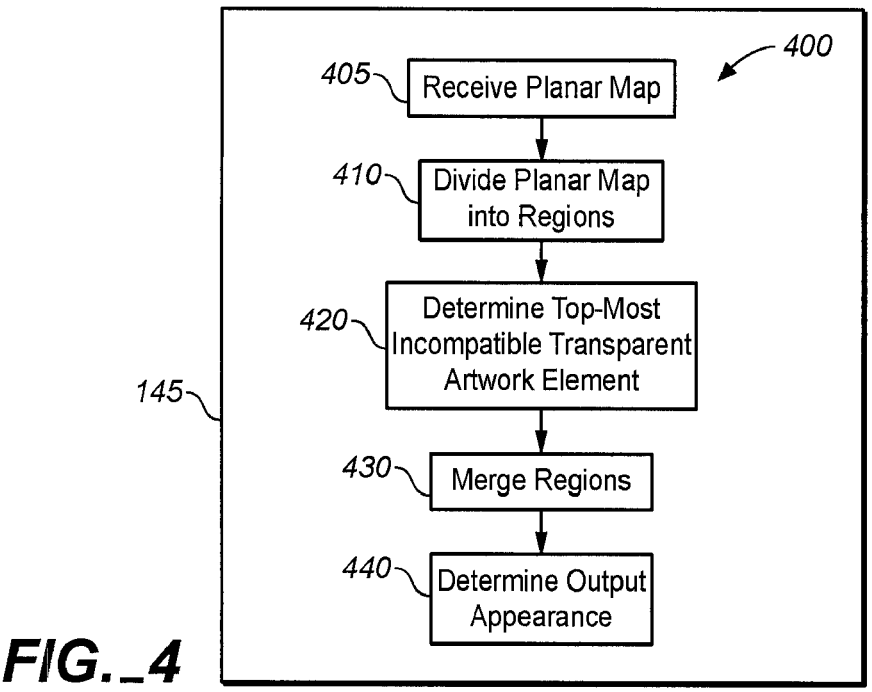
FIG._4
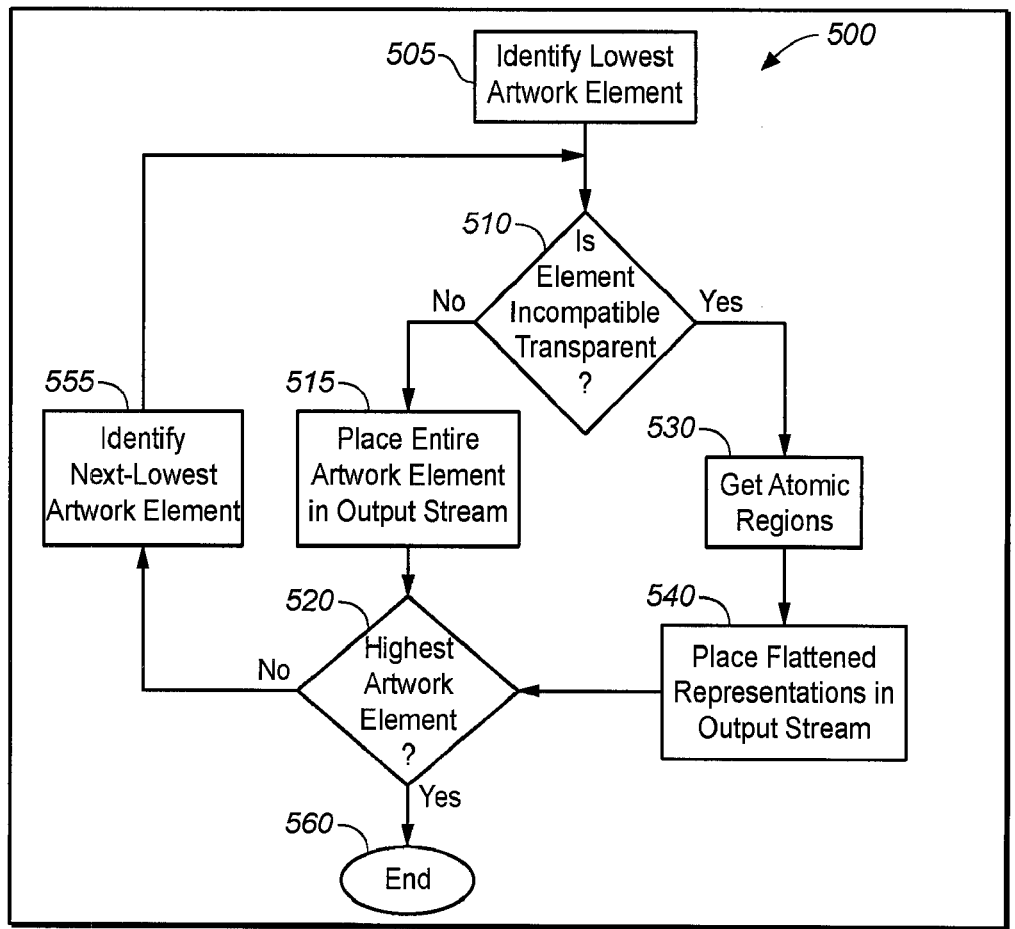
FIG._5

SELECTIVELY TRANSFORMING OVERLAPPING ILLUSTRATION ARTWORK

CROSS-REFERENCE TO RELATED APPLICATIONS

This application is a continuation and claims the benefit of priority under 35 U.S.C. Section 120 of U.S. application Ser. No. 10/703,679, filed Nov. 7, 2003 (now issued U.S. Pat. No. 7,262,782), entitled "Selectively Transforming Overlapping Illustration Artwork". The disclosure of the prior applications is considered part of and is incorporated by reference in the disclosure of this application.

BACKGROUND

The present application relates to processing pieces of artwork in a computer-graphics illustration.

Computer-graphics illustrations are typically made up of a set of artwork elements, such as images, line art, text, or overprinted objects. These artwork elements are typically handled as individual entities, allowing a designer to edit the illustration by moving and modifying the artwork elements after they have been added to the illustration. The artwork elements are typically arranged in a sequence or stack that defines the relative positions of each artwork element with respect to a viewer of the illustration. Artwork elements that are higher up in the sequence are conceptually closer to the viewer, such that if they intersect artwork elements that are lower down in the sequence, the upper element overlaps, and at least partially covers, the lower element.

When a source computer program outputs a computer-graphics illustration to a target, for example another program or a device such as a printer, it can be necessary to process the illustration to remove or transform artwork elements, or their associated properties, that are not compatible with the target. Such artwork elements are typically processed in order to generate representations of them that the target can handle.

As an illustrative example, some computer graphics programs and output devices do not recognize some types of transparency. For this reason, it is sometimes necessary to process transparent artwork to prepare it for output to a target program or device—in particular, when outputting an image containing transparency to a printer. In this context, a transparent artwork element is an element through at least some portion of which it is possible to see underlying elements to at least some degree; an artwork element does not have to be completely transparent to be considered a transparent artwork element. Thus, the appearance of a transparent artwork element is affected by what lies beneath it (without considering the effect of any artwork elements that overlap the transparent element).

Transparent artwork elements containing a type of transparency that the target cannot handle are called, for the purposes of this example, incompatibly transparent artwork elements. In this example, transparent artwork elements that do not contain any type of transparency that the target cannot handle are called compatibly transparent artwork elements. One way of dealing with transparency when preparing an illustration for output to a target that cannot handle some types of transparency is to flatten the incompatibly transparent artwork elements and the elements that they overlap. Flattening is a type of transformation in which artwork elements are merged together into new or modified artwork elements when the interaction between the original elements cannot be accurately represented by the target.

In one prior approach, a flattening program uses an off-screen low-resolution grid to identify artwork elements to be included in a planar map for subsequent flattening. The low-resolution grid allows the program to quickly determine which artwork elements may be overlapped by incompatibly transparent artwork elements. The grid has the same outer boundaries as the image, but uses a relatively small number of grid cells to speed processing. In such an approach, to flatten an illustration the flattening program iterates in reverse paint order through the artwork elements in a computer graphics illustration. If the current artwork element is incompatibly transparent, the flattening program marks each of the cells that it touches in the low-resolution grid and flags the artwork element as being involved in transparency. If the artwork element is not incompatibly transparent, the flattening program determines whether any of the grid cells that it touches are already marked in the low-resolution grid. If so, the flattening program flags the artwork element as being involved in transparency. If in this case the artwork element also happens to be compatibly transparent, the flattening program marks the grid cells that it touches in the low-resolution grid as well. After it has iterated through all of the artwork elements in the illustration, the flattening program adds all of the artwork elements that have been flagged as being involved in transparency to a planar map that maintains the spatial relationships between the included elements, and divides the planar map into non-overlapping flattening regions. If a compatibly transparent artwork element is overlapped by an incompatibly transparent artwork element, it must be added to the planar map. Any artwork elements that this compatibly transparent artwork element overlaps are also added to the planar map, regardless of whether they are overlapped by an incompatibly transparent artwork element. A flattened appearance can then be determined for each flattening region, such that a single non-transparent artwork element with that flattened appearance would closely approximate the appearance of the original collection of overlapping artwork elements in the flattening region. Artwork elements that were included in the planar map are not sent to the target; only the flattened representations of them are sent.

This flattening method can spread the effects of flattening transparency beyond the regions where incompatible transparency is actually present. For example, PostScript® printers are able to process and represent overprinted artwork elements. However, overprinted artwork elements are typically treated as compatibly transparent artwork elements. Therefore, if an opaque artwork element is overlapped by an overprinted artwork element that is in turn overlapped by an incompatibly transparent artwork element that does not overlap the opaque artwork element, all three artwork elements are flattened, even though the target printer could have handled the opaque artwork element without flattening it.

SUMMARY

In one aspect, the invention features computer-implemented methods and apparatus, including computer program products, implementing techniques for converting a computer graphics illustration from an input format to an output format that differs from the input format. The computer graphics illustration includes a plurality of overlapping artwork elements, and each of the artwork elements has an appearance defined by a set of appearance attributes. The overlapping artwork elements of the computer graphics illustration are classified as transparent or non-transparent artwork elements. The transparent artwork elements include any artwork element that has an appearance that can depend, at least in part, on an appearance of an artwork element that is overlapped by the transparent artwork element. The transparent artwork elements are classified as being compatible or incompatible with the output format, where the compatible transparent artwork elements are transparent artwork elements that do not have an appearance attribute that is incompatible with the output format. In contrast, the incompatible transparent artwork elements are transparent artwork elements that have one or more appearance attributes that are incompatible with the output format. The incompatible transparent artwork elements and any of the artwork elements that are at least partially overlapped by any of the incompatible transparent artwork elements are transformed into transformed artwork elements, where the transformed artwork elements are compatible with the output format, without transforming any compatible artwork element that is not overlapped by an incompatible transparent artwork element.

Particular implementations can include one or more of the following features. An output stream that includes one or more of the transformed artwork elements, one or more of the compatible transparent artwork elements, and one or more of the non-transparent artwork elements can be generated. The artwork elements can be arranged according to a paint order of the computer graphics illustration, and an output stream can be generated, where each of the included artwork elements is placed in the output stream based on a placement of a corresponding artwork element or elements in the paint order. The transformation can include positioning each of the incompatible transparent artwork elements and each artwork element that is at least partially overlapped by any of the incompatible transparent artwork elements in a planar map. One or more atomic regions can be defined based on the planar map, where each atomic region includes at least a portion of one or more of the incompatible transparent artwork elements or the at least partially overlapped artwork elements.

Any of the following features may also be included. A top-most incompatible transparent artwork element can be identified in each atomic region. An output stream can be generated, where each transformed artwork element is placed at a position in the output stream based on a position in the paint order of the top-most incompatible transparent artwork element in a corresponding atomic region. The transformation can include determining a flattening output for each atomic region, where the flattening output for an atomic region excludes artwork elements positioned above the topmost incompatible transparent artwork element in the atomic region. Any two or more atomic regions that include an identical set of artwork elements below a common top-most incompatible transparent artwork element can be merged, where the identical set of artwork elements below a common top-most incompatible transparent artwork element can include all artwork elements below the common top-most incompatible transparent artwork element.

One or more of the following features may also be included. Any artwork element that does not extend outside one or more regions defined by one or more overlapping non-transparent artwork elements can be excluded from the output stream. The output stream can be provided to a target program or device, and the compatible transparent artwork elements can be processed as transparent artwork elements in the target program or device. Artwork elements that are at least partially overlapped by any of the incompatible transparent artwork elements can be identified by mapping the artwork elements to a low-resolution grid. If the overlapping artwork elements include a first artwork element that is classified as a compatible artwork element, a second artwork element that is classified as a compatible transparent artwork element, and a third artwork element that is classified as an incompatible transparent artwork element, where the second artwork element is overlapped by the third artwork element and the first artwork element is overlapped by the second artwork element but not by the third artwork element, the transformation can transform the third artwork element and the second artwork element, but not the first artwork element.

The invention can be implemented to realize one or more of the following advantages. Artwork elements that are not incompatible transparent artwork elements do not have to be transformed if they are not overlapped by an incompatible transparent artwork element. Compatible artwork elements can be output to the target in a form that allows them to be edited. Memory can be saved, processing can be speeded, spool sizes can be decreased, and more artwork elements can be output in an intact editable form by transforming only incompatible transparent artwork elements and artwork elements that are overlapped by incompatible transparent artwork elements. The output can be of high quality and have few stitching problems. The effects of the transformation can be predictable. Linked files can be exported without being embedded. Printing or exporting the illustration can occur quickly.

These general and specific aspects may be implemented using a system, a method, a computer program, or any combination of systems, methods, and computer programs.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIG. 1 is a flowchart showing a process that converts an illustration from an input format to an output format.

FIG. 2a shows an example representation of an illustration that includes both compatible and incompatible transparent artwork elements.

FIG. 2b shows an example of a planar map for the illustration of FIG. 2a.

FIG. 3 shows the planar map of FIG. 2b split into example flattening regions.

FIG. 4 is a flowchart showing a method of flattening.

FIG. 5 is a flowchart showing a process of forming an output stream.

Like reference numbers and designations in the various drawings indicate like elements.

DETAILED DESCRIPTION

FIG. 1 illustrates a method 100 for converting a computer graphics illustration from an input format to an output format. The input format is a format in which the illustration is created and/or processed—for example, an Adobe® Illustrator® format—and is defined by a set of rules and properties. The output format is a different format, defined by a different set of rules and properties, into which the illustration is to be converted for further processing by a target application or device—for example, an Adobe® Postscript® format into which the illustration is converted for printing on a Postscript® printer. The input artwork elements are collected (step 110), and each artwork element is classified (step 120) according to whether it is transparent or non-transparent. A transparent artwork element is one whose appearance depends at least in part on the appearance of what is beneath it, without considering the effect of any artwork element that overlaps the transparent artwork element).

Each artwork element that was classified as being transparent is next classified according to whether it is compatible or incompatible with the output format (step 130). In one implementation, the method classifies the artwork elements by comparing a set of appearance attributes for each transparent artwork element with a pre-defined set of appearance attributes that are identified as being incompatible with an output format associated with a specific target, and classifying each transparent artwork element as compatible or incompatible based on the results of the comparison. In one implementation, the set of incompatible attributes can be defined based on user input.

An artwork element is incompatible with the output format if it possesses one or more appearance attributes that are incompatible with the output format; an element is compatible with the output format if it does not possess any incompatible appearance attributes. An appearance attribute is a property associated with an artwork element that affects the appearance of the element (that is, the appearance of the area within the element's path). Appearance attributes may have associated values which can be Boolean (yes/no, true/false), discrete, or continuous. Examples of appearance attributes are color, shape, texture, reflectivity, and transparency, including element transparency, group transparency, overprint, and blend modes. An appearance attribute is incompatible with a target if the target cannot represent an artwork element possessing the attribute or artwork elements whose appearance depends on that artwork element such that the appearance of the artwork elements is substantially the same as it would have been in the source program even if the artwork elements are moved or edited in the target. An appearance attribute is compatible with the target if the target can represent an artwork element possessing the attribute and its interactions such that the artwork element's appearance and its effect on the appearance of other artwork elements are substantially the same as they would have been in the source program.

Each incompatible transparent artwork element is added to a planar map (step 140). The planar map is the collection of artwork elements that will flatten in step 145. The ordering and spatial relationships of the artwork elements is preserved in the planar map.

For each compatible transparent artwork element, the method determines whether the compatible transparent artwork element is overlapped by an incompatible transparent artwork element (step 135). In one implementation, this determination can be made as follows. Each artwork element is mapped onto an off-screen low-resolution grid in reverse paint order, so that artwork elements that are conceptually closer to the viewer are mapped onto the grid first. If the artwork element is an incompatible transparent artwork element, the pixels that it touches in the low-resolution grid are marked. If the artwork element is not an incompatible transparent artwork element, the pixels that it touches in the low-resolution grid are not marked. However, if an artwork element touches any marked pixel in the low-resolution grid (that is, any pixel touched by an incompatible transparent artwork element that is higher in the paint order) when it is mapped onto the grid, the artwork element is processed as being overlapped at least partially by an incompatible transparent artwork element. Because a low-resolution grid is used in this implementation, some artwork elements may be processed as being overlapped by an incompatible transparent artwork element that would not be if a higher-resolution grid were used—that is, some artwork elements that do not in fact intersect with incompatible transparent artwork elements that are higher in the paint order can nevertheless be identified as being overlapped by such incompatible transparent artwork elements. In another implementation, overlapped elements are identified by calculating the intersections of the boundaries of the artwork elements and identifying any artwork elements whose boundaries intersect with those of incompatible transparent artwork elements that are higher in the paint order. In still another implementation, bounding boxes, rotated bounding boxes, or some other shape that includes all of an artwork element can be used to determine whether the artwork element will be processed as being overlapped by an incompatible transparent artwork element.

If it is determined that a compatible transparent artwork element is overlapped partially or wholly by an incompatible transparent artwork element, the compatible transparent artwork element is added to the planar map (step 140). Each compatible transparent artwork element is also placed in the output stream (step 150), regardless of whether the compatible transparent artwork element is overlapped by an incompatible transparent artwork element.

A similar procedure is followed for each non-transparent artwork element. The method determines whether each non-transparent artwork element is overlapped by an incompatible transparent artwork element using the method described above in the context of step 135 (step 122). If it is determined that it is overlapped by an incompatible transparent artwork element, it is added to the planar map (step 140). All non-transparent artwork elements are classified according to whether they are compatible or incompatible with the output format using the method described above in the context of step 130 (step 124). Each compatible non-transparent artwork element is placed in the output stream (step 150), while each incompatible non-transparent artwork element is first made compatible with the output format (step 126) and then is placed in the output stream (step 150). An incompatible non-transparent artwork element can be made compatible with the output format by using the appearance attributes that are compatible with the output format to approximate the appearance of the incompatible non-transparent artwork element as closely as possible. The incompatible non-transparent artwork element can then be replaced by a compatible non-transparent artwork element that approximates its appearance.

The incompatible transparent artwork elements and those artwork elements that they overlap (i.e., the artwork elements in the planar map) are flattened to form flattened artwork elements that are compatible with the output format (step 145). These flattened artwork elements are then sent to step 150. In step 150, the compatible artwork elements from steps 124, 126, and 135 and the flattened artwork elements from step 145 are organized into an output stream. All of the artwork elements in the output stream are compatible with the output format. Each output artwork element is placed in the output stream such that the ordering of artwork elements in the output stream corresponds to the ordering of the original artwork elements, and the artwork elements in the output stream approximate the appearance of the original artwork elements. The output stream is provided to the target (step 160), and the target can then process any of the provided artwork elements, transparent or non-transparent, as a compatible artwork element.

Referring to FIG. 2*a*, an illustration 200 includes a plurality of overlapping artwork elements 210-270 and a non-overlapping artwork element 280. The unshaded artwork elements 215 and 230 in the illustration are transparent and have one or more appearance attributes that are incompatible with an example output format, and are thus classified as incompatible transparent artwork elements, while the shaded artwork elements 210, 220, 240-280 are not classified as incompatible transparent artwork elements. The artwork elements are numbered according to their order in the illustration—for example, based on the paint order of the illustration—such that artwork element 210 is the top-most element in the illustration, and artwork element 280 is the bottom-most element. Artwork element 210 overlaps artwork element 230. Element 215 overlaps element 220, which in turn overlaps elements 230, 250, and 260. Element 230 overlaps elements 240 and 250, and element 260 overlaps element 270.

FIG. 2b illustrates a planar map 205 generated from the artwork elements of illustration 200 in FIG. 2a. The unshaded artwork elements are again transparent and incompatible with the example output format. The planar map is processed in step 145 of FIG. 1 to produce a set of flattened artwork elements that are compatible with the output format and have substantially the same appearance as the original artwork elements in the planar map.

FIG. 4 shows a flowchart of a method 400 implementing a flattening process that can be used in flattening step 145 of FIG. 1. The method receives a planar map (step 405) that includes all of the incompatible transparent artwork elements and artwork elements that are at least partially overlapped by one or more incompatible transparent artwork elements, and divides the planar map into flattening regions (step 410). Flattening regions are non-overlapping portions of the illustration that are flattened individually. Each flattening region includes at least a portion of one or more artwork elements from the planar map. The flattened appearance of a flattening region is based on the appearance of the artwork elements in the region.

FIG. 3 illustrates a set of flattening regions 300 generated by dividing the planar map 205 of FIG. 2b into flattening regions according to one implementation. Spaces have been added between adjacent flattening regions to make the boundaries of each region clear. The flattening regions 305-390 are atomic regions. In one implementation, atomic regions are the individual non-null areas defined by the intersection of either the inside or the outside area of every artwork element in the planar map. A given atomic region includes a portion of one or more artwork elements that form a set of artwork elements that is not identically the same as the set of artwork elements in any other atomic region. In this implementation, regions 320 and 350 are a single atomic region, regions 330 and 370 are another atomic region, and regions 305 and 360 are also a single atomic region. In another implementation, regions 305, 320, 330, 350, 360, and 370 are all separate atomic regions. Regions 310, 320, 330, 350, 370, and 380 contain portions of two artwork elements, and region 340 contains portions of three artwork elements.

Referring again to FIG. 4, the top-most incompatible transparent artwork element in each flattening region is determined (step 420). If the set of artwork elements below the top-most incompatible transparent artwork element in the region, inclusive, is the same for any two or more flattening regions, the method can merge these flattening regions to form a single flattening region (step 430). For example, flattening regions 320, 340, and 350 in FIG. 3 can be merged to form one flattening region, since they all have artwork element 230 as the top-most incompatible transparent artwork element and include only artwork element 250 beneath it. An output appearance for each region is determined in step 440. This can be accomplished for a region by compositing all of the artwork elements below the top-most incompatible transparent artwork element, inclusive, in the region into a single artwork element that is compatible with the output format. For example, when atomic region 340 of FIG. 3 is flattened, only the portions of artwork elements 230 and 250 that fall within the atomic region must be composited; artwork element 220 can be ignored since it is higher than incompatible transparent element 230. The output of the flattening is a set of flattened artwork elements that are compatible with the output format.

FIG. 5 is a flowchart of a method 500 implementing a process that can be used to order the output stream in step 150 of FIG. 1. The method begins by identifying the bottom-most artwork element in the set of artwork elements of the original illustration (step 505). The method determines whether that original element was classified as being an incompatible transparent artwork element (step 510). If it was not (the "No" branch of decision 510), the artwork element from step 124 or 135 or its compatible approximation from step 126 is placed in the output stream (step 515). If the artwork element was classified as being incompatible transparent (the "Yes" branch of decision 510), the method obtains the atomic regions from step 145, if any, in which the artwork element is the highest incompatible transparent artwork element (step 530). If the artwork element is not the highest incompatible transparent artwork element in any atomic region, the method proceeds to step 520. If there is one or more atomic region in which the artwork element is the highest incompatible transparent artwork element, the flattened output for each of these atomic regions is placed in the output stream at a location corresponding to the paint order of the artwork element. The individual atomic regions can be placed in the output stream in different orders, depending on the implementation. In one implementation, the order in which the individual atomic elements are placed in the output stream depends on the position in the paint order of the artwork elements, if any, that were below the artwork element in the flattening stack for the corresponding atomic region (step 540). The atomic region in which the first artwork element below the highest incompatible transparent artwork element lies highest in the paint order is output first. If multiple atomic regions contain that same next artwork element, the atomic region in which the next artwork element below that artwork element is highest in the paint order is output first, and so on.

After the method places an artwork element in the output stream in step 515 or places a set of flattened artwork elements in the output stream in step 540, the method determines whether the last processed original artwork element is the highest artwork element in the original illustration (step 520). If the artwork element is not the highest artwork element in the original illustration (the "No" branch of decision 520), the method identifies the next-lowest original artwork element (step 555) and returns to step 510 to begin processing that artwork element. When the highest artwork element in the original illustration has been processed (the "Yes" branch of decision 520), the method ends.

The techniques described above can be implemented to limit the number of artwork elements that must be transformed in order to convert an input illustration into a form that is usable in an output format, thereby speeding the processing required for the conversion and preserving more of the original artwork elements in editable form. As illustrated in FIG. 2a, artwork elements 210, 260, 270, and 280 will not be transformed, even if they contain transparency, since none of them are overlapped by an incompatible transparent artwork element. For example, if artwork element 260 were compatible and non-transparent, artwork element 220 were compatible and transparent, and artwork element 215 were incompatible and transparent, artwork element 260 would not be included in the planar map or be transformed even though it is overlapped by a compatible transparent artwork element that is in turn overlapped by an incompatible transparent artwork element.

The invention and all of the functional operations described in this specification can be implemented in digital electronic circuitry, or in computer hardware, firmware, software, or in combinations of them. The invention can be implemented as a computer program product, i.e., a computer program tangibly embodied in a computer-readable medium, e.g., in a machine readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Computer-readable media suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention has been described in terms of particular embodiments. Other embodiments are within the scope of the following claims. For example, the steps of the invention can be performed in a different order and still achieve desirable results. As discussed above, compatible artwork elements and incompatible non-transparent artwork elements that are included in the planar map are typically also included in the output stream. In one implementation, those elements that will be completely obscured by one or more of the artwork elements output from the transformation step are excluded from the output stream. For example, artwork element 240 in FIG. 2b would not be included in the output stream, since it would otherwise be obscured by a transformed artwork element.

In a similar implementation, compatible artwork elements and incompatible non-transparent artwork elements that are obscured by non-transparent artwork elements do not need to be included in the output stream. Therefore, if artwork element 260 in FIG. 2a were non-transparent, artwork element 270 would not need to be included in the output stream, since it would be completely hidden by higher element 260.

Method 100 can also be implemented so that only the portion of an artwork element that will not be fully obscured by the output of the transformation is included in the output stream. This can be accomplished by creating a proxy for the artwork element that contains only the portion of the original element that is not obscured by the transformation output, effectively truncating the artwork element. For example, a proxy could be created for the portion of artwork element 250 in FIG. 2b that is not covered by 230. The proxy could then be included in the output stream instead of including artwork element 250.

In another implementation, the portion of the planar map lying under a non-transparent artwork element is not transformed, and no output is generated for it or included in the output stream. In such an implementation, if artwork element 220 in FIG. 2b were non-transparent, the portion of the planar map lying under element 220, which includes portions of artwork elements 230 and 250, would not be transformed.

If artwork elements are only visible when they are within a certain area of the illustration, they do not need to be transformed when they are outside that area.

In a three-dimensional illustration, the paint order of the artwork elements depends on the viewing plane that is used, though other ordering methods used to determine overlap may not. In three dimensions, appearance attributes can include such attributes as deformability.

What is claimed is:

1. A computer-implemented method comprising:
  receiving, by a data processing apparatus, a computer graphics illustration including multiple overlapping artwork elements in an input format, the multiple overlapping artwork elements including transparent artwork elements and one or more non-transparent artwork elements, each of the transparent artwork elements being either compatible or incompatible with an output format; and
  transforming, by the data processing apparatus, an incompatible transparent artwork element and at least a portion of an artwork element that is at least partially overlapped by the incompatible transparent artwork element into transformed artwork elements, without transforming, with respect to the output format, any portion of compatible artwork elements that are not overlapped by the incompatible transparent artwork element, the transformed artwork elements being compatible with the output format.

2. The method of claim 1, further comprising:
  generating an output stream that includes one or more of the transformed artwork elements, one or more of the compatible transparent artwork elements, and one or more of the non-transparent artwork elements.

3. The method of claim 2, wherein:
the artwork elements are arranged according to a paint order of the computer graphics illustration; and
generating an output stream includes placing each of the included artwork elements in the output stream based on a placement of a corresponding artwork element or elements in the paint order.

4. The method of claim 2, wherein:
transforming includes positioning the incompatible transparent artwork element and the at least a portion of the artwork element that is at least partially overlapped by the incompatible transparent artwork element in a planar map, and defining one or more atomic regions based on the planar map, each atomic region including at least a portion of the incompatible transparent artwork element or the at least a portion of the artwork element that is at least partially overlapped.

5. The method of claim 4, wherein:
the transparent artwork elements comprise multiple incompatible transparent artwork elements;
the artwork elements are arranged according to a paint order of the computer graphics illustration;
defining one or more atomic regions includes identifying a top-most incompatible transparent artwork element in each atomic region; and
generating an output stream includes placing each transformed artwork element at a position in the output stream based on a position in the paint order of the top-most incompatible transparent artwork element in a corresponding atomic region.

6. The method of claim 5, wherein:
transforming includes determining a flattening output for each atomic region, the flattening output for an atomic region excluding artwork elements positioned above the top-most incompatible transparent artwork element in the atomic region.

7. The method of claim 6, wherein:
defining one or more atomic regions includes merging any two or more atomic regions that include an identical set of artwork elements below a common top-most incompatible transparent artwork element.

8. The method of claim 7, wherein:
the identical set of artwork elements below a common top-most incompatible transparent artwork element includes all artwork elements below the common top-most incompatible transparent artwork element.

9. The method of claim 2, wherein:
generating the output stream includes excluding any artwork element that does not extend outside one or more regions defined by one or more overlapping non-transparent artwork elements.

10. The method of claim 2, further comprising:
providing the output stream to a target program or device; and
processing the compatible transparent artwork elements as transparent artwork elements in the target program or device.

11. The method of claim 1, wherein:
transforming includes identifying the at least a portion of the artwork element that is at least partially overlapped by the incompatible transparent artwork element by mapping the at least a portion to a low-resolution grid.

12. The method of claim 1, wherein:
the overlapping artwork elements include a first artwork element that is classified as a compatible artwork element, a second artwork element that is classified as a compatible transparent artwork element, and a third artwork element that is classified as an incompatible transparent artwork element, at least a portion of the second artwork element being overlapped by the third artwork element, the first artwork element being overlapped by the second artwork element and not the third artwork element; and
transforming includes transforming the third artwork element and the at least a portion of the second artwork element, but not the first artwork element.

13. The method of claim 1, wherein the transparent artwork elements include any artwork element having an appearance that can depend at least in part on an appearance of an artwork element that is overlapped by the transparent artwork element.

14. The method of claim 1, wherein:
the compatible transparent artwork elements are transparent artwork elements having no appearance attribute that is incompatible with the output format; and
the incompatible transparent artwork element is a transparent artwork element having one or more appearance attributes that are incompatible with the output format.

15. A computer-readable medium tangibly embodying a computer program product encoding instructions operable to cause data processing apparatus to perform operations comprising:
receiving a computer graphics illustration including multiple overlapping artwork elements in an input format, the multiple overlapping artwork elements including transparent artwork elements and one or more non-transparent artwork elements, each of the transparent artwork elements being either compatible or incompatible with an output format; and
transforming an incompatible transparent artwork element and at least a portion of an artwork element that is at least partially overlapped by the incompatible transparent artwork element into transformed artwork elements, without transforming, with respect to the output format, any portion of compatible artwork elements that are not overlapped by the incompatible transparent artwork element, the transformed artwork elements being compatible with the output format.

16. The computer-readable medium of claim 15, the operations further comprising generating an output stream that includes one or more of the transformed artwork elements, one or more of the compatible transparent artwork elements, and one or more of the non-transparent artwork elements.

17. The computer-readable medium of claim 16, wherein:
the artwork elements are arranged according to a paint order of the computer graphics illustration; and
generating an output stream includes placing each of the included artwork elements in the output stream based on a placement of a corresponding artwork element or elements in the paint order.

18. The computer-readable medium of claim 16, wherein:
transforming includes positioning the incompatible transparent artwork element and the at least a portion of the artwork element that is at least partially overlapped by the incompatible transparent artwork element in a planar map, and defining one or more atomic regions based on the planar map, each atomic region including at least a portion of the incompatible transparent artwork element or the at least a portion of the artwork element that is at least partially overlapped.

19. The computer-readable medium of claim 18, wherein:
the transparent artwork elements comprise multiple incompatible transparent artwork elements;

the artwork elements are arranged according to a paint order of the computer graphics illustration;

defining one or more atomic regions includes identifying a top-most incompatible transparent artwork element in each atomic region; and generating an output stream includes placing each transformed artwork element at a position in the output stream based on a position in the paint order of the top-most incompatible transparent artwork element in a corresponding atomic region.

20. The computer-readable medium of claim 19, wherein transforming includes determining a flattening output for each atomic region, the flattening output for an atomic region excluding artwork elements positioned above the top-most incompatible transparent artwork element in the atomic region.

21. The computer-readable medium of claim 20, wherein defining one or more atomic regions includes merging any two or more atomic regions that include an identical set of artwork elements below a common top-most incompatible transparent artwork element.

22. The computer-readable medium of claim 21, wherein the identical set of artwork elements below a common top-most incompatible transparent artwork element includes all artwork elements below the common top-most incompatible transparent artwork element.

23. The computer-readable medium of claim 16, wherein generating the output stream includes excluding any artwork element that does not extend outside one or more regions defined by one or more overlapping non-transparent artwork elements.

24. The computer-readable medium of claim 16, the operations further comprising:

providing the output stream to a target program or device; and processing the compatible transparent artwork elements as transparent artwork elements in the target program or device.

25. The computer-readable medium of claim 15, wherein transforming includes identifying the at least a portion of the artwork element that is at least partially overlapped by the incompatible transparent artwork element by mapping the at least a portion to a low-resolution grid.

26. The computer-readable medium of claim 15, wherein:

the overlapping artwork elements include a first artwork element that is classified as a compatible artwork element, a second artwork element that is classified as a compatible transparent artwork element, and a third artwork element that is classified as an incompatible transparent artwork element, at least a portion of the second artwork element being overlapped by the third artwork element, the first artwork element being overlapped by the second artwork element and not the third artwork element; and transforming includes transforming the third artwork element and the at least a portion of the second artwork element, but not the first artwork element.

27. The computer-readable medium of claim 15, wherein the transparent artwork elements include any artwork element having an appearance that can depend at least in part on an appearance of an artwork element that is overlapped by the transparent artwork element.

28. The computer-readable medium of claim 15, wherein:

the compatible transparent artwork elements are transparent artwork elements having no appearance attribute that is incompatible with the output format; and the incompatible transparent artwork elements are transparent artwork elements having one or more appearance attributes that are incompatible with the output format.

29. A system comprising:

a processor; and a computer-readable medium comprising instructions to cause the processor to perform operations comprising:

receiving a computer graphics illustration including multiple overlapping artwork elements in an input format, the multiple overlapping artwork elements including transparent artwork elements and one or more non-transparent artwork elements, each of the transparent artwork elements being either compatible or incompatible with an output format; and transforming an incompatible transparent artwork element and at least a portion of an artwork element that is at least partially overlapped by the incompatible transparent artwork element into transformed artwork elements, without transforming, with respect to the output format, any portion of compatible artwork elements that are not overlapped by the incompatible transparent artwork element, the transformed artwork elements being compatible with the output format.

30. The system of claim 29, the operations further comprising generating an output stream that includes one or more of the transformed artwork elements, one or more of the compatible transparent artwork elements, and one or more of the non-transparent artwork elements.

31. The system of claim 30, wherein:

the artwork elements are arranged according to a paint order of the computer graphics illustration; and generating an output stream includes placing each of the included artwork elements in the output stream based on a placement of a corresponding artwork element or elements in the paint order.

32. The system of claim 30, wherein:

transforming includes positioning the incompatible transparent artwork element and the at least a portion of the artwork element that is at least partially overlapped by the incompatible transparent artwork element in a planar map, and defining one or more atomic regions based on the planar map, each atomic region including at least a portion of the incompatible transparent artwork element or the at least a portion of the artwork element that is at least partially overlapped.

33. The system of claim 32, wherein:

the transparent artwork elements comprise multiple incompatible transparent artwork elements;

the artwork elements are arranged according to a paint order of the computer graphics illustration;

defining one or more atomic regions includes identifying a top-most incompatible transparent artwork element in each atomic region; and generating an output stream includes placing each transformed artwork element at a position in the output stream based on a position in the paint order of the top-most incompatible transparent artwork element in a corresponding atomic region.

34. The system of claim 33, wherein transforming includes determining a flattening output for each atomic region, the flattening output for an atomic region excluding artwork elements positioned above the top-most incompatible transparent artwork element in the atomic region.

35. The system of claim 34, wherein defining one or more atomic regions includes merging any two or more atomic regions that include an identical set of artwork elements below a common top-most incompatible transparent artwork element.

36. The system of claim 35, wherein the identical set of artwork elements below a common top-most incompatible transparent artwork element includes all artwork elements below the common top-most incompatible transparent artwork element.

37. The system of claim 30, wherein generating the output stream includes excluding any artwork element that does not extend outside one or more regions defined by one or more overlapping non-transparent artwork elements.

38. The system of claim 30, the operations further comprising:
   providing the output stream to a target program or device; and
   processing the compatible transparent artwork elements as transparent artwork elements in the target program or device.

39. The system of claim 29, wherein transforming includes identifying the at least a portion of the artwork element that is at least partially overlapped by any of the incompatible transparent artwork element by mapping the at least a portion to a low-resolution grid.

40. The system of claim 29, wherein:
   the overlapping artwork elements include a first artwork element that is classified as a compatible artwork element, a second artwork element that is classified as a compatible transparent artwork element, and a third artwork element that is classified as an incompatible transparent artwork element, at least a portion of the second artwork element being overlapped by the third artwork element, the first artwork element being overlapped by the second artwork element and not the third artwork element; and
   transforming includes transforming the third artwork element and the at least a portion of the second artwork element, but not the first artwork element.

41. The system of claim 29, wherein the transparent artwork elements include any artwork element having an appearance that can depend at least in part on an appearance of an artwork element that is overlapped by the transparent artwork element.

42. The system of claim 29, wherein:
   the compatible transparent artwork elements are transparent artwork elements having no appearance attribute that is incompatible with the output format; and
   the incompatible transparent artwork elements are transparent artwork elements having one or more appearance attributes that are incompatible with the output format.

* * * * *